United States Patent [19]

Roos et al.

[11] 4,319,280

[45] Mar. 9, 1982

[54] APPARATUS FOR CONVERTING CINEMATOGRAPHIC PICTURES INTO VIDEO SIGNALS

[75] Inventors: Jan Roos; Klaas Compaan; Adrianus C. van Kasteren, all of Eindhoven, Netherlands

[73] Assignee: U.S. Philips Corporation, New York, N.Y.

[21] Appl. No.: 124,403

[22] Filed: Feb. 25, 1980

[30] Foreign Application Priority Data

Feb. 26, 1979 [NL] Netherlands .......................... 7901476

[51] Int. Cl.³ .......................... H04N 3/36; H04N 9/11
[52] U.S. Cl. .................................... 358/214; 350/54
[58] Field of Search .......................... 358/54, 214–216, 358/293, 130–132, 206, 208; 346/109; 250/235

[56] References Cited

U.S. PATENT DOCUMENTS 3,794,755  2/1974  Metzger .............................. 358/214

FOREIGN PATENT DOCUMENTS 498945    1/1939  United Kingdom ................ 358/214
2011756  12/1978  United Kingdom .
2025731   7/1979  United Kingdom .

OTHER PUBLICATIONS

Childs et al, "An Experimental Telecine Using a Line-Array CCD Sensor," *SMPTE Journal*, vol. 87, No. 4, Apr. 1978, pp. 209-213.

*Primary Examiner*—John C. Martin
*Attorney, Agent, or Firm*—Thomas A. Briody; Robert T. Mayer; Algy Tamoshunas

[57] ABSTRACT

An apparatus is described for converting cinematographic images into video signals. The film gate in which a frame to be scanned is located is illuminated uniformly. The film is scanned by means of a rotatable scanning mirror, which with the aid of an imaging system images one line of the film frame onto one row (three rows for color film) of radiation sensitive detectors. The detectors of a row are read sequentially. The illumination beam has a large aperture angle in a first plane transverse to the direction of film transport and a small aperture angle in a plane transverse to the first plane. The film movement is detected with the aid of a sprocket hole detection system, in which an elongate narrow light spot, whose longitudinal direction is transverse to the direction of film transport, is projected onto the strip of film with the sprocket holes. The position of the scanning mirror is detected with the aid of two gratings of special shape.

12 Claims, 26 Drawing Figures

APPARATUS FOR CONVERTING CINEMATOGRAPHIC PICTURES INTO VIDEO SIGNALS

BACKGROUND OF THE INVENTION

The invention relates to an apparatus for converting cinematographic pictures into video signals, which apparatus comprises a film gate, transport means for moving a film through the film gate, and opto-electronic means for scanning a film frame, which is located in the film gate, with a light beam and for converting the light beam which has been modulated by the film frame into electrical signals.

Such apparatus is known, inter alia from the article: "Vom Super 8 Film auf den Farbbildschirm" in: "Funkschau" 1974, No. 9, pages 956–962. In the known apparatus a film frame is scanned with a light beam obtained from a cathode ray tube. The light beam transmitted by the film is received by, in principle, a single radiation sensitive detector, for example in the form of a photomultiplier. The detector supplies an electronic signal which, after processing in electronic circuits, can be displayed by means of a conventional television set.

For reproducing a colour film with a colour television set, a colour splitting system, for example comprising dichroic mirrors, may be disposed in the radiation path of the light beam coming from the film. Said system splits the light into a red, a green and a blue beam, which beams propagate in different directions. Each of the three radiation paths thus formed includes a radiation sensitive detector.

In the cathode ray tube a rectangular area of the picture screen is scanned by an electron beam. This area, which has a uniform brightness, is imaged onto a film frame by an objective. Thus, all points of a film frame are sequentially imaged on the detector, or on the three detectors.

The use of a cathode ray tube in apparatus for converting cinematographic pictures into video signals has some drawbacks, especially if said apparatus is intended as a consumer product. The cathode ray tube must be operated at high voltages in order to obtain a satisfactory brightness. As a result of this the picture screen of the cathode ray tube will emit a comparatively large amount of X-radiation. As always at least one complete film frame is to be imaged, stringent requirements must be imposed on the optical system which is used. Furthermore, steps must be taken to compensate for the attenuation of the marginal rays relative to the central rays of the beams and to compensate for the persistence of the c.r.t. screen.

SUMMARY OF THE INVENTION

It is the object of the present invention to provide an apparatus for converting cinematographic pictures into video signals, employing a different scanning method, without cathode ray tube. The apparatus in accordance with the invention is characterized in that there is provided an illumination system for simultaneously illuminating the entire film gate, and that the said opto-electronic means are constituted by a scanning mirror, which is pivotable about an axis which is effectively transverse to the film transport direction, by at least one row of radiation sensitive detectors, the number of detectors being equal to the number of points to be scanned of a line of the film frame, and by an optical imaging system for imaging a line of the film frame, which line has been selected by the scanning mirror, on the row of detectors, the scanning mirror forming part of said imaging system.

Whereas in known apparatus both the illumination of the film frame and the scanning of the points within said frame is performed by one element, the cathode ray tube, there are provided a separate illumination system and a separate scanning system in the apparatus in accordance with the invention. The scanning of the points of one line of a film frame is effected electronically. The detector signals can simultaneously be read into a shift register, after which said shift register is read out in known manner. The film frame is scanned in accordance with a raster, the pitch of the raster, formed by the scanning lines, being determined by the small angle through which the scanning mirror is shifted periodically.

It is to be noted that it is known per se, for example from U.S. Pat. No. 3,067,284, to employ a rotatable plane mirror in apparatus for the conversion of cinematographic pictures into video signals. However, in the known apparatus film scanning is effected by a cathode ray tube; the plane mirror serves to ensure that the image of the film frame being scanned on the cathode ray tube remains stationary.

A preferred embodiment of an apparatus in accordance with the invention is characterized in that the elements of the imaging system disposed between the film and the scanning mirror are mirrors.

The optical path between the film and the scanning mirror then includes no lenses, which have limited apertures and fields of view and thus constitute stops. The only limiting element in the said part of the optical path is an illumination window, i.e. the last element of the illumination system, or the scanning mirror itself. The imaging system consequently does not exhibit vignetting.

Suitably an embodiment of an apparatus in accordance with the invention in which the dimension of the film gate in the direction of film transport corresponds to a length of film comprising two frames and in which the scanning mirror can be shifted through a maximum angle which corresponds to the said length of film, is further characterized in that the illumination system comprises means which ensure a uniform light distribution.

The said means may be constituted by one or more diffuser plates. As the film gate is illuminated uniformly, the ultimate video picture exhibits no flicker as a result of the transition from one frame to the next frame.

Preferably, the power necessary for the drive of the plane scanning mirror is minimized. Therefore, the dimensions of this mirror, in particular the dimension transverse to the axis of rotation, which is contained in the expression for the mass moment of inertia of said mirror as a square-law function, should be minimized. On the other hand, care must be taken that the aperture angle of the scanning beam is large, i.e. that the depth of focus of the illumination optics is small, so that scratches and the like on the back of the film are not imaged sharply. In order to meet these requirements an apparatus in accordance with the invention, in which the illumination system comprises an illumination window as last element, is characterized in that the illumination window is rectangular, that the long and the short side of the illumination window are respectively transverse and parallel to the direction of film transport, and that the dimension of the scanning mirror transverse to its axis of rotation corresponds to the dimension of the image of the short side of the illumination window at the location of the scanning mirror.

Use is made of the fact of any scratches on the back of the film only those scratches which extend in the longitudinal direction of the film may be annoying, because ultimately these scratches may become visible on the television screen as stationary vertical streaks. The rectangular illumination window now ensures that the angle of aperture of the beam in the plane transverse to the film transport direction is large, so that the scratches which extend in this direction are imaged unsharply. Scratches transverse to the film transport direction occur hardly ever. Moreover, such scratches, are considerably less annoying. Therefore the angle of aperture of the beam in the film transport direction may be small. It is this last-mentioned aperture which determines the dimension of the scanning mirror transverse to its axis of rotation, so that this dimension may also be small.

It is to be noted that it is known, inter alia from British patent specification No. 414,730, to employ non-rotation symmetrical illumination optics for scanning a film. In the apparatus in accordance with the said British patent specification the illumination optics is intended for adequately illuminating a narrow slit having the width of one line of a frame to be scanned, and not for illuminating a film gate which may accomodate two complete frames. Moreover, the angle of aperture of the beam in the plane transverse to the film transport direction is small, while the angle of aperture in the plane of the film transport direction is large.

In the apparatus in accordance with the invention it is required to know at any instant which line of which frame is being scanned. This requires the detection of: the sequence number of the film frame to be scanned, and the position of the scanning mirror. For determining the frame number and the exact position of the frame being scanned within the film gate use can be made of the so-called sprocket holes which are uniformly spaced from each other in a strip of film stock adjacent the film frames. The sprocket holes in conjunction with a sprocket wheel have provided the film transport in the camera with which the film has been recorded. In film technology it is customary to normalize the frame number and the frame position of a film frame with respect to a sprocket hole, so that the leading edge of a sprocket hole is fixed relative to the leading edge of a frame. The passage of a sprocket hole through a specific position can be detected with a so-called sprocket hole detection system. Such a system comprises an auxiliary illumination system for the formation of a light spot on the said strip of film and a radiation sensitive auxiliary detector for detecting the amount of light produced by the said light spot.

In known sprocket hole detection systems, for example in the system described in U.S. Pat. No. 2,506,198, the relevant strip of film is illuminated with a circular light spot with an area of the order of magnitude of that of a sprocket hole. Detection is based on the fact that as long as the light spot is incident on the strip of film outside a sprocket hole the film absorbs a specific amount of light, so that a comparatively small amount of light reaches the auxiliary detector which is disposed behind the film. If a sprocket hole is situated underneath the light spot, the detector will receive a comparatively large amount of light. This detection method is only reliable if the transmission of the strip of film in which the sprocket holes are formed is well defined. However, this is not always the case. There are films in which said strip is black and films in which said strip is transparent. Moreover, said strip frequently contains indications from the manufacturer of the film. Furthermore, there may be dust particles both on the said strip and in a sprocket hole.

Therefore, it is a further object of the invention to provide a sprocket-hole detection system which enables the leading edge of such a sprocket hole to be detected in an unambigious manner. To this end the apparatus in accordance with the invention is further characterized in that the auxiliary illumination system and the auxiliary detector both have an effective aperture whose dimension in the film transport direction and transverse thereto is substantially smaller than and of the same order of magnitude as respectively the dimension of the sprocket holes in the film transport direction and transverse thereto respectively.

A very narrow radiation spot is formed on the film strip in which the sprocket holes are located. As soon as the leading edge of a sprocket hole reaches the light spot the light is diffracted; most part of the light is diffracted beyond the narrow opening of the detector. Upon the passage of the leading edge of a sprocket hole the signal of the auxiliary detector will exhibit a negative peak, which is much steeper and deeper than a peak as a result of absorption of the film, even of a black film. By electronically detecting a low value on the trailing edge of the peak, the passage of a sprocket hole cannot be confounded with the passage of for example a manufacturer's indication on the film. Because of the elongate shape of the light spot the influence of dust particles is negligible. This detection device enables the leading edges of the sprocket holes in both black and transparent film strips to be detected.

The auxiliary illumination system may be constituted by a radiation source and a cylindrical lens system, whose cylinder axis extends transversely to the direction of film transport. The radiation source is for example a light-emitting diode (L.E.D.) or a semiconductor diode laser, such as an AlGaAs laser, which emits a beam which in itself has an elongate cross-section, so that no cylindrical lens need be used. The auxiliary detector may be constituted by a slit diaphragm, whose longitudinal direction extends transversely to the direction of film transport, and a photodiode arranged behind the diaphragm. Between said diaphragm and the photo diode a lens should be included for concentrating all the light which passes through the diaphragm slit onto the photo diode.

A simpler arrangement is obtained by the use of a fibre optic array, of which at least one end has an elongate cross-section. A fibre optic array is to be understood to mean a light-transmission element comprising one or more optically conductive fibres. Such a fibre optic array may be used both in the auxiliary illumination system, for transferring light from the radiation source to the film, and in the auxiliary detector, for transmitting light from the film to the photo diode.

The fibre optic array may comprise a row of circular glass optical fibres. In order to obtain the required detection accuracy these fibres should be very thin, having for example a cross-section of 50 $\mu$m. Such thin fibres are rather vulnerable, difficult to manufacture and thus expensive.

Therefore, a sprocket hole detection system is preferably characterized in that the fibre optic array(s) is (are) constituted by one optical fibre having a flat end. Such a fibre can be obtained by —preferably hot— flattening one end of a thicker round fibre, which is convenient to handle, until an approximately rectangular cross-section is obtained.

If circular instead of rectangular sprocket holes are to be detected, a thicker optical fibre may be flattened in a concave jig, so that the cross-section of the fibre end has the shape of an annular segment of a ring. A row of thin optical fibres may also have such a shape.

If for detecting sprocket holes use is made of the light reflected by the film strip, the auxiliary illumination system and the auxiliary detector being consequently situated on one side of the film, it suffices to use one row of thin fibres, which are alternately connected to the radiation source and to the photo diode.

It is to be noted that it is known per se, for example from U.S. Pat. No. 3,746,840, to employ a row of optical fibres for scanning a film. However, in this case the row of fibres is used for scanning a line of a cinematographic picture and not for detecting sprocket holes. The number of fibres of the row determines the number of points of a film line that can be resolved, so that a very great number of fibres is necessary. In principle, each fibre is connected to a separate photo diode. Thus, unlike in the sprocket hole detection system in accordance with the invention, the light from all fibres is not received simultaneously by one photodiode.

When a rotatable scanning mirror is used in an apparatus for converting cinematographic images into video signals the position of the scanning mirror should accurately be controlled and thus be detected. U.S. Pat. No. 3,835,249 describes an optical scanning device which employs a mirror drum for deflecting the scanning beam. In order to detect the position of the scanning beam a portion is split off the scanning beam and passed to a grating, behind which grating a radiation sensitive detector is arranged. As the mirror drum rotates the split-off portion of the light beam travels over the grating, so that the output signal of the detector varies depending on the movement of the mirror drum. In the known apparatur the beam portion will at the most illuminate one transparent line of the grating, so that the amplitude of the detector signal will be very low.

It is a further object of the present invention to provide a different system for detecting the position of the scanning mirror, in which inter alia the radiation sensitive detection system supplies an output signal of comparatively high amplitude. To this end an apparatus in accordance with the invention is characterized in that the mirror-position detection system comprises a first stationary grating, a second stationary grating, an imaging system for imaging the first grating on the second grating via the scanning mirror, and a radiation sensitive detection system which is arranged behind the second grating.

An apparatus in accordance with the invention, which is intended as a consumer product, is preferably further characterized in that the first grating is arranged in the plane of the film gate and that the imaging system for imaging the first grating on the second grating is constituted by elements of the imaging system for imaging a line of the film frame on a row of detectors.

The first grating is then illuminated by the illumination system for the film gate. In that case no separate illumination system and no separate imaging system is needed for the mirror-position detection.

The first grating may alternatively be arranged outside the plane of the film gate and be illuminated by a separate system. In that case a separate imaging system is required for mirror-position detection. This arrangement will mainly be used in more professional equipment.

A preferred embodiment of a mirror-position detection system in accordance with the invention is characterized in that the second grating comprises three grating sections, a first grating section comprising only one transparent line and a second and a third grating section each comprising $n_1$ transparent grating lines and having the same grating period, and the second grating section being shifted over a distance equal to a quarter of its grating period relative to the third grating section, and that the first grating comprises series of each time $n_2$ transparent grating lines, the distance between the series being equal to one and a half times the grating period within the series, and $n_1$ and $n_2$ being integers and $n_2$ being preferably equal to $n_1 - 1$.

The value of $n_1$ is determined by the number of grating lines of the first grating that can be imaged simultaneously in the plane of the second grating by an imaging system with a specific aperture angle. In an embodiment of a mirror-position detection system in accordance with the invention this value was for example $n_1 = 20$.

DESCRIPTION OF THE DRAWINGS

The invention is now described in more detail with reference to the drawings. In the drawings.

DESCRIPTION OF THE PREFERRED EMBODIMENT

Figure 1:
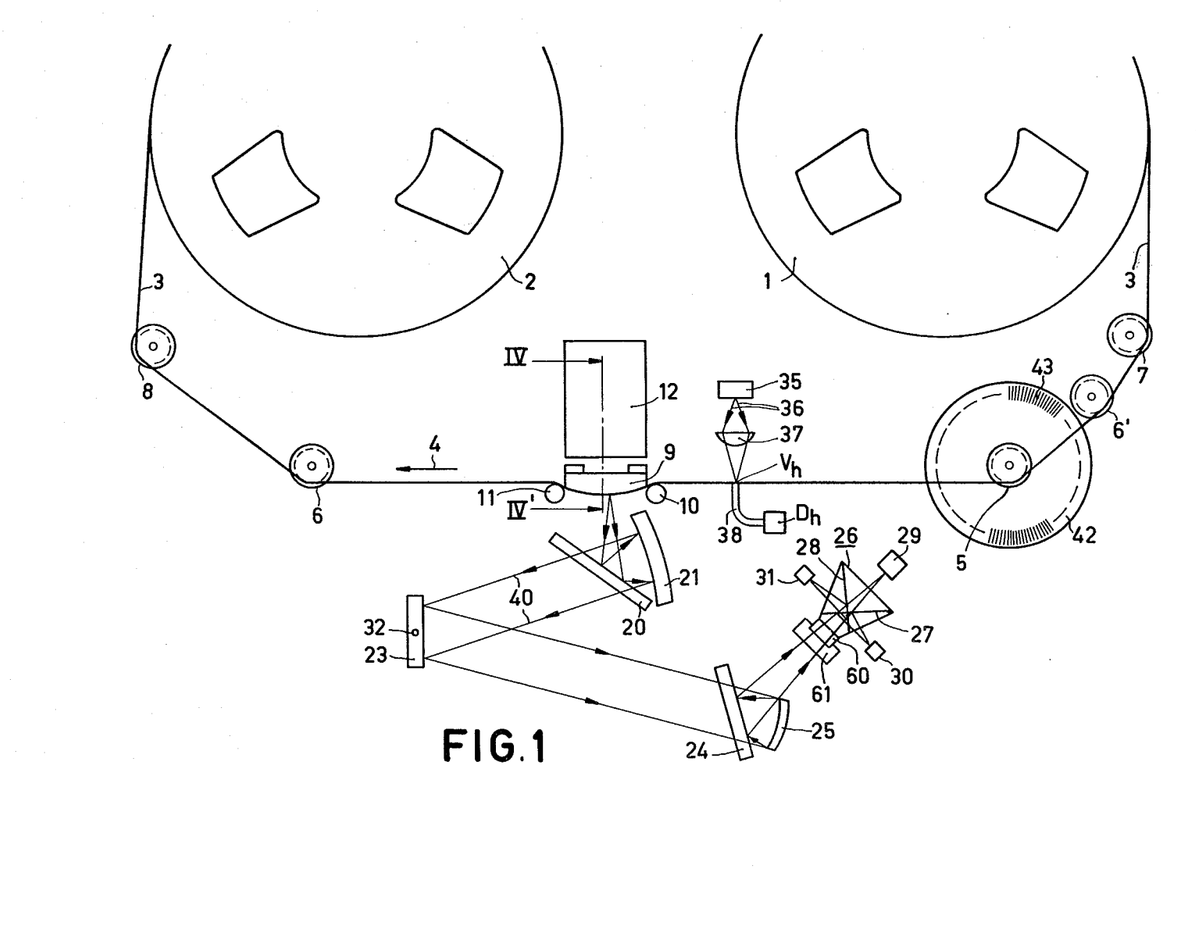
FIG. 1 schematically and in plan view shows an embodiment of an apparatus in accordance with the invention.

In FIG. 1 a supply reel containing the film 3 to be scanned is designated 1. A take-up reel for the length of film 3 already scanned is designated 2. The film is moved in the direction 4 with constant speed by the film drive roller (capstan 5), passing over the film guide rollers 7 and 8. The rollers 6 and 6' are measuring rollers by means of which the film tension can be measured. If necessary, this tension may be corrected by, for example, moving the roller 6, which is secured to an arm, not shown. The film gate is designated 9, in which gate 9 the portion of the film 3 being scanned is located. The film gate 9 is preferably part-cylindrical, the centre of curvature being located in the centre of the illumination optics. The film is pressed in position by spindles or ball bearings 10 and 11. The length, i.e. the dimension in the direction 4 of the film gate 9, is preferably equal to the length of a portion of the film 3 which contains two film frames. Then always at least one complete film frame will be located in the film gate 9, independently of the fact whether the film 3 runs forward, is stationary or runs in reverse. The film 3 is illuminated via the back by an illumination system 12, which is described in more detail hereinafter.

The lower part of FIG. 1 shows the optical scanning system. In principle, the scanning system comprises a scanning mirror 23, which is pivotable about an axis 32 perpendicular to the plane of the drawing, and at least one row of radiation sensitive detectors 29, which row extends perpendicularly to the plane of the drawing. Furthermore, there is provided an imaging system comprising semi-transparent mirrors 20 and 24 and concave mirrors 21 and 25.

The scanning beam 40 which passes through the film 3 is partly reflected to the concave mirror 21 by the semitransparent mirror 20. The mirror 21 reflects the incident light back to the semitransparent mirror 20, which transmits a part of the beam to the scanning mirror 23. Upon reflection by the scanning mirror 23 a part of the beam passes through the semitransparent mirror 24 and is subsequently incident on the concave mirror 25, which again thereupon reflects the beam. Via a further reflection on the semitransparent mirror 24 the scanning beam is directed to the row of detectors 29.

The concave mirrors 21 and 25 are rectangular concave mirrors, whose long axes are perpendicular to the plane of the drawing. The system 20, 21, 23, 24 and 25 conjugates each point in the plane of the film gate 9 to a separate point in the plane of the detectors 29. Conversely, it may be said that the row of detectors 29 is imaged on the film 3 as a narrow strip whose longitudinal direction is transverse to the plane of the drawing. Thus, at any instant, the row of detectors 29 observes only a narrow strip of a film frame being scanned. The width of this strip, hereinafter referred to as scanning line, is determined by the magnification of the system of concave mirrors 21 and 25 and by the height h of the detectors 29.

Figure 2:
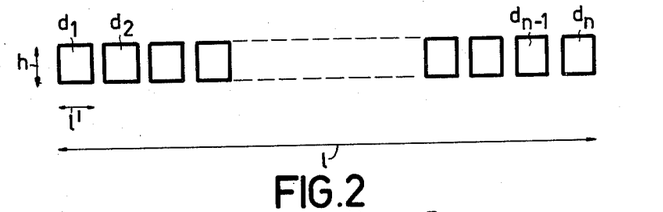
FIG. 2 is a front view of a detector row employed in said apparatus.

FIG. 2 shows the detector row 29 in front view. This row comprises a number of separate detectors $d_1$ to $d_4$, for example photodiodes, phototransistors or other photosensitive elements. The height h, i.e. the dimension transverse to the plane of the drawing in FIG. 1, and the magnification of the selected optical imaging system dictate the length 1 of the detector row 29. The technology used in the manufacture of the semiconductor detectors 29 determines how many detectors, having a length 1', can be realized within the length 1'. This also defines the number of points of a scanning line that can be resolved. The imaging optics should be such that the detectors $d_1$ to $d_n$ are separately imaged on the film.

Which line of a film frame located within the film gate 9 is scanned at a specific instant, is obviously determined by the position of the scanning mirror 23 at this instant. FIG. 1 represents the situation in which the scanning line is in the centre of the film gate 9. When the mirror 23 is rotated counter-clockwise or clockwise, the scanning line is moved to the left or the right, respectively.

The focus of the concave mirror 21 is situated at the front of the film 3, i.e. the side where the picture information is located. Between the mirrors 21 and 25, and thus also at the location of the scanning mirror 23, the beam 40 is a parallel beam. This ensures that, independently of the position of the scanning mirror 23, the beam 40 is always sharply imaged on the detector row 29 and that no magnification errors can arise.

The first part of the imaging optics by means of which an area of the sizes of two film frames is to be imaged, will always include a concave mirror 21. By means of the part of the imaging optics behind the scanning mirror 23, only one line need be imaged. Therefore, the concave mirror 25 may be smaller than the concave mirror 21. The semitransparent mirror 24 and the concave mirror 25 may also be replaced by a preferably achromatic lens system, such as a doublet. Such a lens system can be cheaper than a mirror system. Moreover, less light is reflected in that case, so that more light is available for the detectors 29.

In principle, the scanning mirror 23 is a plane mirror. However, the reflecting surface of this mirror 23 may also be slightly curved and thus function as a kind of spherical Schmidt corrector, by means of which the imaging errors of the optical mirror system can be corrected. If the elements 24 and 25 have been replaced by a lens system, steps can be taken in ensure that this lens system corrects the imaging errors of the mirror optics and the scanning mirror 23 itself may be entirely plane.

Generally, the film 3 to be scanned will be a color film. In that case, as is shown in FIG. 1, a color splitting system 26 will be included between the semitransparent mirror 24 and the detection system, and the detection system will comprise three rows (29, 30, 31) of radiation sensitive detectors. The detector rows 30 and 31 are constructed in a similar way as is shown in FIG. 2 for the row 29. The system 26 may be constituted by a color splitting prism containing two dichroic layers 27 and 28. The layer 27 for example only reflects the blue color component of the incident light to the detector row 30 and transmits the rest of the light. The layer 28 for example reflects only the red color component of the incident light to the detector row 31. After traversing the layers 27 and 28, only the green light component of the incident light is left. This component is incident on the detector row 29.

Color separation may also be achieved with the aid of a diffraction grating in the form of a phase grating, which comprises a multitude of each time three grating grooves, which three grating grooves have different depths. Such a color separation grating is for example described in the German Patent Application No. 2,645,075, which has been laid open for public inspection, and is not discussed in more detail. When a color separation grating is used the three rows of detectors (29, 30, 31) may be arranged adjacent each other in one plane, the rows having the same direction as the grating grooves. If the detectors comprise photo diodes, the three rows of detectors (29, 30, 31) may be integrated on one substrate, so that the detection system of FIG. 1 may be replaced by a very compact system.

FIG. 1 only shows the mechanical and optical components necessary for film scanning. The manner in which and the means with which the signals from the detector rows 29, 30 and 31 are processed fall beyonds the scope of the present invention and are therefore not discussed. It is to be noted only that the detector signals of each row (29, 30, 31) are read out sequentially.

Figures 3, 4, 5:
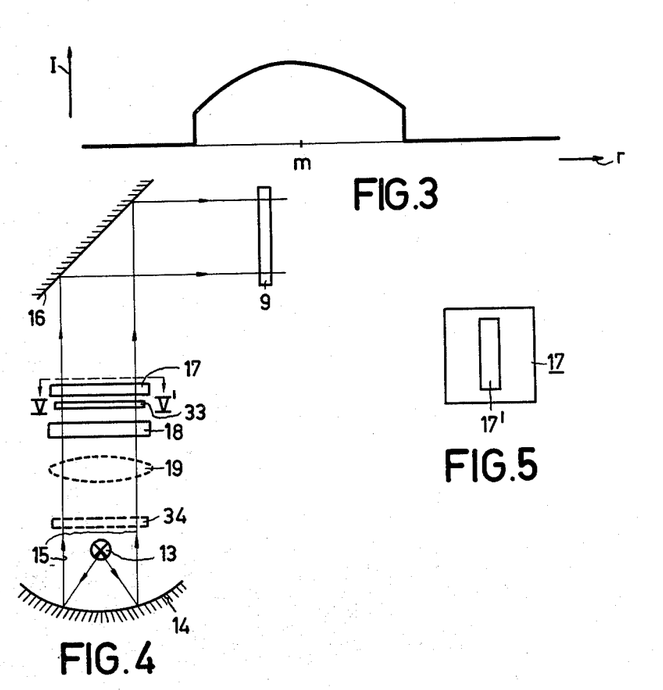
FIG. 3 shows a film gate with a film passing through said gate, as well as the light distribution within said gate produced by a conventional illumination system.
FIG. 4 shows an illumination system in accordance with the invention.
FIG. 5 is a front view of the illumination window of said illumination system.

The illumination system 12 has been adapted to the special method of scanning used in the apparatus in accordance with the invention in two respects. As stated previously, the length of the film gate 9, i.e. the dimension in the direction of film transport 4, has been selected so that it can accommodate two film frames. FIG. 3 by way of example shows a part of a super-8 film 3. The frames are designated $B_1$, $B_2$, $B_3$ and $B_4$ and the sprocket holes are designated $S_h$. The film gate 9 is represented by dashed lines. FIG. 3 furthermore shows a scanning line $S_1$, namely at the position which corresponds to the centre position m of the scanning mirror 23 shown in FIG. 1.

In FIG. 3 it has been assumed that the film moves in the direction 4', i.e. to the right. When the frame $B_3$ is scanned, the scanning line moves from position $P_1$ to the left. The positions $P_1$, $P_2$, $P_3$ and $P_4$ shown in FIG. 3 are positions on the film 3, and thus pass through the film gate 9. As soon as the scanning line has arrived at position $P_2$, the scanning line jumps back to position $P_1$, which in the mean time has moved to the right, after which the frame $B_3$ is scanned again. The frame $B_3$ is scanned several times until this frame is about to leave the film gate, i.e. $P_1$ has passed the right-hand side of the film gate. After the last scan of the frame $B_3$, i.e. when the scanning line has arrived at $P_2$, the scanning line does not jump back to $P_1$, but continues to $P_3$, and subsequently to $P_4$, the frame $B_4$ thus being scanned. This frame is also scanned a number of times.

The number of times that a film frame is scanned depends on the number of frames-per-second at which the film 3 has been recorded and should thus be played. The number of scans-per-frame will be smaller as the film speed increases. When the film 3 runs at a speed of eighteen frames-per-second and in the video reproducing apparatus fifty fields-per-second are written, the film frames should be scanned either three times or two times.

In general a light beam produced by an illumination system for scanning a film, which system employs an incandescent lamp or a gas discharge lamp as light source, will have a non-uniform light distribution. In the lower part of FIG. 3 the light intensity of such a beam as a function of the position r within the film gate 9 is represented. It will be evident that with the described method of scanning such a light distribution results in the right-hand part of the frame $B_3$ being scanned with a lower light intensity than the left-hand part of this frame during the last scan of said film frame. This means that during the last scan of the right-hand part of frame $B_3$ the output signals of the detector row 29 or 30 or 31 have a lower average level than during the last scan of the left-hand part of this frame. Ultimately the left-hand and the right-hand part of a frame are respectively reproduced as the lower and the upper part of a video picture. Thus, the lower part of the video picture resulting from the last scan of the film frame $B_3$ will be slightly brighter than the upper part. This is not a problem in itself, but the next video picture, i.e. the picture resulting from the first scan of the film frame $B_2$, has an inverse brightness distribution. Indeed, the right-hand part of the film frame $B_2$ is scanned with a higher light intensity and the left-hand part with a lower light intensity. This brightness variation in the video picture will be annoying to the viewer because of the comparatively low frequency with which its recurs.

The invention ensures that the illumination system produces a light beam of uniform brightness. For this purpose a diffuser plate, or a plurality of these plates, may be included in this system. FIG. 4 shows an embodiment of an illumination system 12. In this embodiment the light source is arranged underneath the film 3. FIG. 4 consequently is a cross-section of the illumination system taken in the line IV—IV' in FIG. 1.

The light source 13 is for example a 50-Watt film projector lamp with a blue-light reflector 14. The light emitted by the light source 13 is intercepted by the spherical concave mirror 14, which focusses the light. The light beam 15 passes through an illumination window 17 and is reflected by a plane mirror 16 in the direction of the film gate 9. The path of the light beam 15 includes a diffuser plate 18 which diffuses the incident light, ensuring that the beam 15 which passes through the window 17 has a uniform light distribution. If the cross-section of the beam 15 is not adapted to the window 17, a lens 19, shown dashed in FIG. 4, may be arranged in the light path. The diffuser 18 may also be arranged in the window 17. The light path may also include a heat filter 34, which prevents the film 3 from being overheated.

The second adaptation of the illumination system concerns the cross-section of the light beam produced by said system. A conventional film projector generally employs an optical system with a large aperture angle in order to obtain a high-intensity projected image. An advantage of such an optical system is that it has a small depth of focus. As a result of this scratches and the like on the back of the film 3, whatever the direction of these scratches, are not sharply imaged on the detector rows 29, 30, 31. However, a drawback of the use of an optical system with a large aperture angle is that the optical elements in the light path should have large dimensions. Larger optical elements which comply with specific quality requirements, however, are more expensive than smaller ones, so that, in particular in a consumer product, optical elements are preferred which are as small as possible. A considerable drawback of a large scanning mirror is, moreover, that a high power is required to drive said mirror and that the position of the mirror cannot be controlled very accurately. In particular the dimension of the scanning mirror transverse to its axis of rotation is of importance in this respect, because this dimension occurs in the expression for the mass moment of inertia of this mirror as a square-law function.

The illumination system of the apparatus in accordance with the invention has been designed so that only those scratches which extend in the longitudinal direction of a film, i.e. in the direction 4 in FIG. 1, are imaged unsharply.

Figure 6:
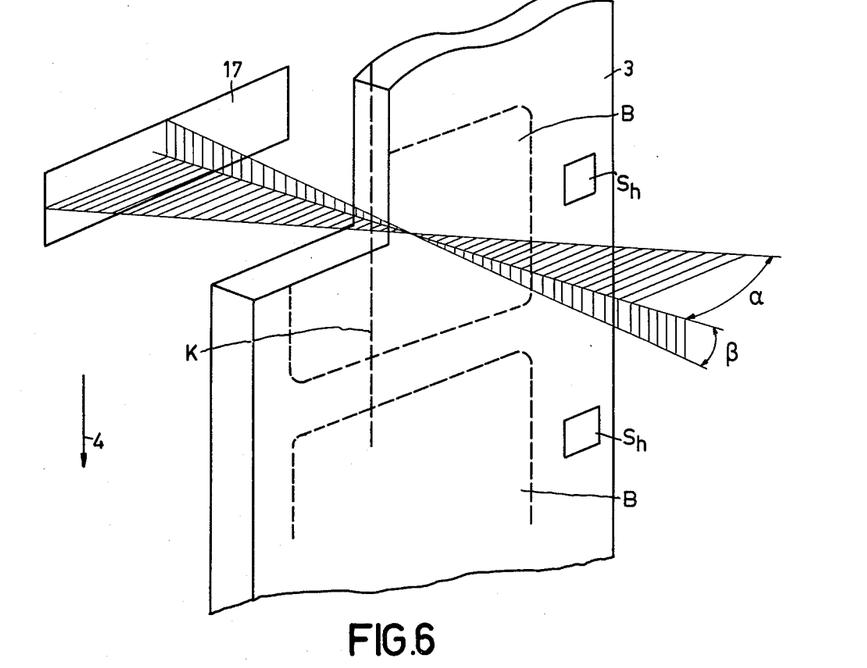
FIG. 6 shows a film with a scratch on the back as well an illumination window in accordance with the invention.

FIG. 6 shows a part of a film 3, having such a scratch k on the back. This scratch is perpendicular to the scanning line which travels in the direction 4. Thus, if scanning were effected with a beam path having a small aperture angle, each time a further part of the scratch would be imaged on a detector row. A scratch which extends in the longitudinal direction of a film would be visible on the ultimate video picture as a stationary vertical line. However, a scratch which extends in the lateral direction of the film would disturb one film frame at the most. Moreover, such a scratch is unlikely to occur.

In order to eliminate the influence of the scratch K it is ensured that the aperture angle of the beam in the plane transverse to the scratch, i.e. the aperture angle $\alpha$ in FIG. 6, is large. As the influence of scratches transverse to the direction of film transport need not be eliminated, the angle of aperture in the direction of film transport, i.e. the aperture angle $\beta$ in FIG. 6 may be small. This angle determines the dimension of the scanning mirror 23 transverse to its axis of rotation 32, so that this dimension may also be small. Therefore, it is very advantageous if the illumination system has a large aperture angle $\alpha$ and a small aperture angle $\beta$. In order to obtain such an asymmetrical illumination, the aperture 17' of the illumination window 17 is made rectangular. FIG. 5 shows this window in an elevation in accordance with the line V—V' in FIG. 4. For an optimum illumination of the window 17, the light path in accordance with FIG. 4 may also include a cylindrical lens 33 near the window 17. The cylinder axis of the lens 33 is then parallel to the longitudinal direction of the slit 17'.

The film 3 to be scanned has been recorded at 18 or 24 frames-per-second and should be moved at the same speed during scanning. However, in a video reproducing apparatus 50 video fields-per-second are written. In order to enable the film scanning speed to be adaped to the writing speed of the video apparatus by electronic means, it should be known precisely which film line of which film frame is actually being scanned at any instant. This requires the detection of:
the sequence number of the film frame being scanned
the movement of the film frame in the film gate 9
the instantaneous position of the scanning mirror 23.
For counting the film frame, use can be made of the sprocket holes in the film.

For this purpose, the apparatus comprise a so-called sprocket hole detection system. This detection system is arranged at such a location in the apparatus that it detects a sprocket hole which is located at a standard distance from the frame to be scanned instantaneously. In principle a sprocket hole detection system comprises an auxiliary light source for illuminating the strip of film in which said holes are located, and an auxiliary detector for intercepting either the light transmitted by said strip of film or the light reflected by said strip of film.

In known sprocket hole detection systems, such as that described in U.S. Pat. No. 2,506,198, a rotation-symmetrical light beam is used, which forms a circular radiation spot of the order of magnitude of a sprocket hole on the film. The method employed in the known detection system is based on the fact that a sprocket hole transmits all light, while the strip of film beyond such a hole absorbs light.

In the sprocket hole detection system in accordance with the invention only the passage of the leading edge of a sprocket hole is detected. The length of such a hole has no influence on the detection. In accordance with the invention a light spot is formed on the film strip, of which spot the dimension transverse to the direction of film transport is of the order of magnitude of the spocket hole dimension in the said direction, while the dimension of the light spot in the direction of film transport is substantially smaller. The aperture of the auxiliary detector has dimensions of the same order of magnitude as those of the light spot. As soon as the leading edge of a sprocket hole passes underneath the light spot, the light is diffracted; most of the light is diffracted outside the detector aperture. As a result of the strong diffraction effect the sprocket hole detection is virtually unaffected by absorption by the film or by dust particles and the like on the film.

Figure 7A:
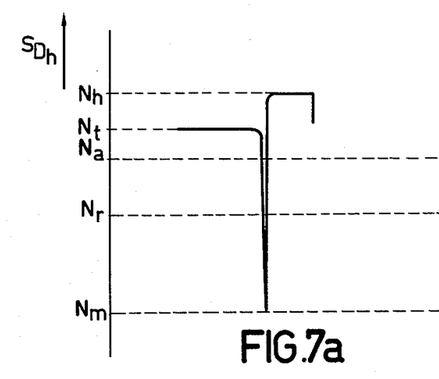
FIGS. 7a and 7b represent the signals supplied by a sprocket hole detection system in accordance with the invention for a film with a transparent film strip and a film with a black film strip respectively.
Figure 7B:
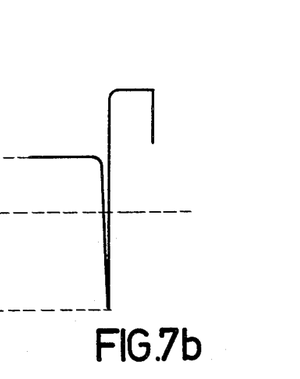

FIG. 7a and FIG. 7b illustrate this diffraction effect for a film with a transparent and a black strip of film between the sprocket holes. $SD_h$ is the signal supplied by the auxiliary detector ($D_h$ in FIG. 1). As long as a transparent strip of film passes underneath the light spot this signal has the level $N_t$. As soon as the leading edge of a sprocket hole reaches the light spot, the signal $SD_h$ decreases very rapidly to the level $N_m$. As the film advances the signal $SD_h$ again increases comparatively fast to the maximum value $N_h$. All the light from the auxiliary light source is then transmitted to the auxiliary detector.

When a black strip of film passes underneath the light spot the signal from the auxiliary detector has the level $N_a$ (compare FIG. 7b), which level through absorption by the film is lower than the level $N_t$. The signal decreases very rapidly to the level $N_m$, if the leading edge of a sprocket hole reaches the light spot. As the film is advanced the signal increases very rapidly until the maximum value $N_h$ is attained again.

The radiation sensitive auxiliary detector is connected to an electronic level detector, which supplies a pulse each time that the reference level $N_r$ is reached in the rising edge of the voltage transient. If there is one sprocket hole per film frame, like in a super-8 film, each pulse denotes a film transport over one frame. From FIGS. 7a and 7b it follows that the generation of this pulse is not influenced by the light absorption of the film.

Figure 8:
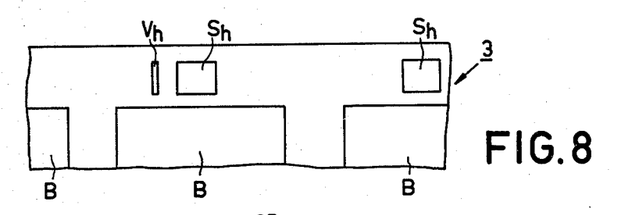
FIG. 8 shows a part of a film on which a light spot is projected as produced in the sprocket hole detection system.

FIG. 1 shows a first embodiment of a sprocket hole detection system in accordance with the invention. This system comprises an auxiliary light source 35, which emits a light beam 36. The cylindrical lens 37 concentrates the light of this beam on the film as an elongate light spot $V_h$. FIG. 8 shows the position and the size of the spot $V_h$ relative to the sprocket holes $S_h$. The detection system furthermore comprises a fibre optic array 38, which guides the light coming from the film to the auxiliary detector $D_h$. For a film with a transparent strip of film between the sprocket holes the light source 35 and the detector $D_h$ are located on different sides of the film.

In a second embodiment of a sprocket hole detection system, which is intended for detecting sprocket holes in a slightly reflecting strip of film, the auxiliary light source 35 and the auxiliary detector are arranged on the same side of the film. In the last-mentioned case the chief ray of the light beam 36 is incident on the film at an angle which differs from 90°, and the light beam is reflected at the same angle by the film strip between the sprocket holes.

The auxiliary light source 35 may for example be a light emitting diode (LED) or a semiconductor diode laser, such as an AlGaAs diode laser. The light beam from the last mentioned laser already has an elongate cross-section of itself, so that in this case the cylindrical lens 37 may be dispensed with.

Figure 9:
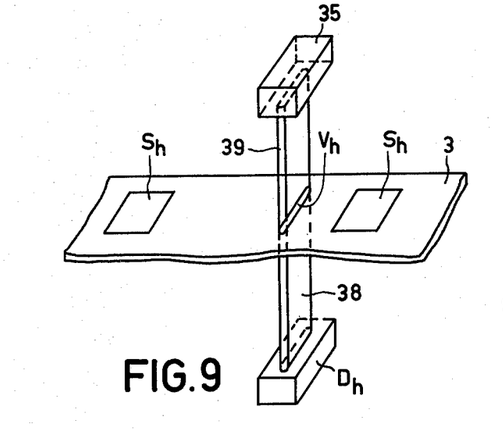
FIGS. 9 and 10 show embodiments of the sprocket hole detection system in accordance with the invention.
Figure 10:
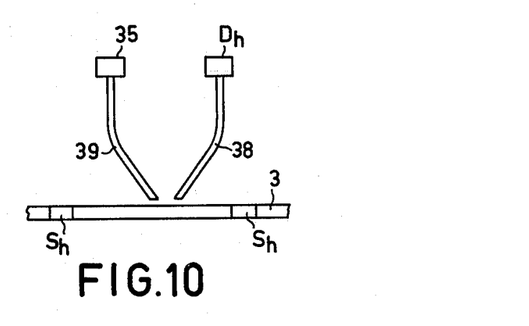

In addition to a first fibre optic array 38 for concentrating the light coming from the film onto the auxiliary detector a second fibre optic array 39 for forming the light spot on the film may be provided, as is shown in FIGS. 9 and 10. In FIG. 9 and FIG. 10, sprocket holes are detected in a transparent film and in a slightly reflecting film respectively.

The use of fibre optics has the advantage that the auxiliary light source and the auxiliary detector can be arranged at locations where there is sufficient room for these elements, yet enabling the light to be brought sufficiently close to the film. Moreover, a fibre optic array enables the light to be focussed correctly.

For the formation of the light spot $V_h$ it is alternatively possible to employ part of the light from the main light source 13, which is conveyed to the strip with the sprocket holes via a fibre-optic array.

Figures 11, 12:
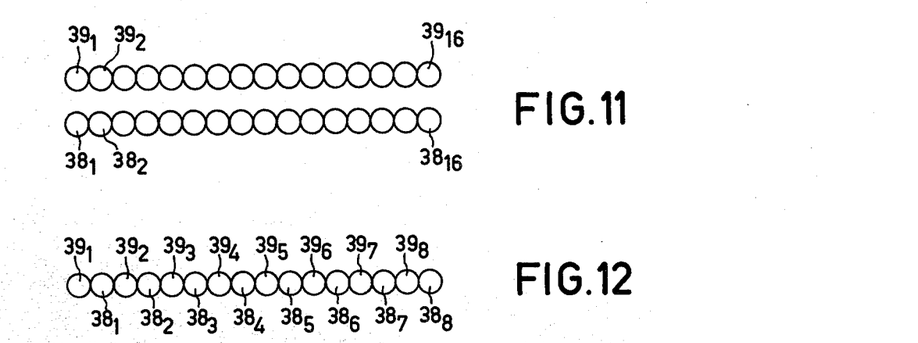
FIGS. 11, 12, 13 and 14 show embodiments of fibre optic arrays used in said detection system.

A fibre-optic array with an elongate cross-section may be formed by a row of thin optical fibres of round cross-section. FIG. 11 shows two rows of such fibres $38_1$ through $38_{16}$ and $39_1$ through $39_{16}$, for the fibre optic array 38 and the fibre optic array 39, respectively, of FIG. 10 in cross-section.

In the detection system of FIG. 10 it is also possible, as is shown in FIG. 12, to connect the optical fibres of one row alternately to the light source 35 and to the detector $D_h$, so that one row of optical fibres suffices.

The accuracy with which the arrival of a sprocket hole is to be detected is for example 5 μm. In that case the diameter of an optical fibre should be 50 μm at the most. The dimension of the sprocket holes transverse to the direction of film transport is for example 80 μm. For a satisfactory illumination of the holes 16 fibres should then be arranged adjacent each other.

Figure 13:
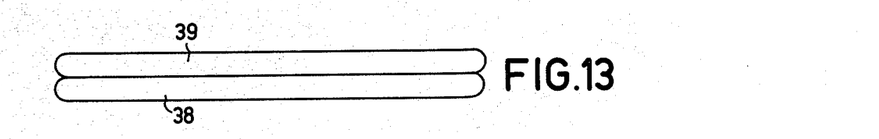

Optical fibres of glass with a diameter of 50 μm are very vulnerable. A fibre optic array comprising 16 or more optical fibres is an expensive and vulnerable construction. It is much cheaper and more reliable to use two thicker plastics circular fibres with a diameter of for example 300 μm, which are convenient to handle. In order to obtain the desired cross-section at the location of the film, one end of each fibre is, preferably hot, flattened until an approximately rectangular cross-section is obtained of for example 1000×50 μm. These dimensions may also be influenced by simultaneously stretching the fibres. The two flat ends of the fibres pressed together are arranged just above the film, one fibre being connected to the light source 35 and the other fibre to the detector $D_h$. Then a robust assembly is obtained which is cheap to manufacture. FIG. 13 shows a cross-section through the flat ends of the said fibres.

Figure 14:
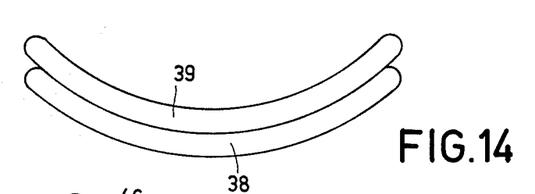

If for example a circular instead of a rectangular sprocket hole is to be detected, the desired shape of the ends of the optical fibres can be obtained by compressing the thicker circular fibres in a concave jig. Thus, optical fibres are obtained whose ends have the shape of FIG. 14 at the location of the film.

Figure 15:
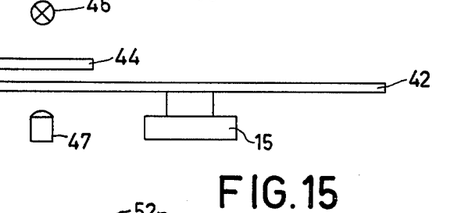
FIG. 15 shows a system for determining the film motion.
Figure 16:
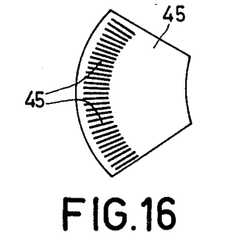
FIG. 16 shows a disc provided with a grating for said system.

In order to determine which line of a film frame is being scanned instantaneously, both the film movement and the position of the scanning mirror 23 should be detected. The film movement can be detected in a manner known per se, for example from German patent application No. 2,615,653, which has been laid open for public inspection. Use is then made of a disc 42 which is coupled to the same shaft as the drive roller 5. As is schematically shown in FIG. 1, the disc 42 is provided with a grating pattern 43 of radially extending grating lines. Just above the disc 42, a stationary disc sector 44 is arranged which has the same radial grating pattern 45 as the disc 42. FIG. 15 shows the discs 42 and 44 in radial cross-section, while FIG. 16 is a plan view of the disc sector 44. The discs 44 and 42 are illuminated by a light source 46, and the light which passes through the discs is received by a radiation sensitive detector 47.

If the grating lines of the gratings 43 and 45 are opposite each other, the detector 47 will receive a maximum amount of light. If the lines of the grating 43 are shifted relative to the lines of the grating 45 over a distance equal to half the grating period, the detector 47 will receive a minimum amount of light. When the disc 42 moves as a result of the movement of the drive roller 5, the detector 47 will supply a train of pulses. It is possible to ensure that each time that the film has moved over a distance equal to the period of the scanning lines, the grating 43 is advanced over a distance equal to its grating period and the detector 47 supplies one counting pulse. By counting the pulses from the detector 47 it is possible to detect how far the film frame has advanced in the film gate.

Figure 17:
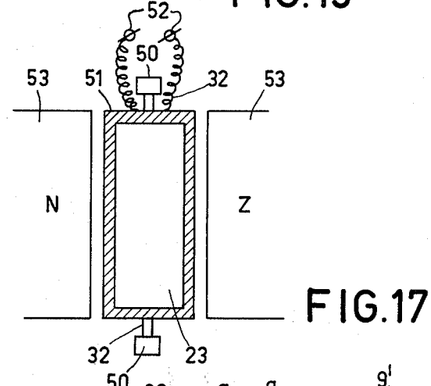
FIG. 17 shows an embodiment of a drive for the scanning mirror.

In order to know which line of the film frame is actually being scanned, the position of the scanning mirror 23 should also be known very accurately. FIG. 17 by way of example, indicates how this mirror 23 may be driven. The mirror 23 is rotatable about the spindle 32 which extends through the centre of gravity thereof and which is journalled in the bearings 50. Around the periphery of the mirror 23 turns of wire 51 are arranged, which turns are disposed in a magnetic field which is produced by the poles shown as 53. By applying a control current to the terminals 52, which constitute the ends of the turns of wire 51, the rotation of the mirror 23 is accelerated or decelerated, the second derivative of the angle of rotation being proportional to the control current. Instead of a wire winding 51 it is alternatively possible to arrange a ribbon winding on the periphery of the mirror 23. It is also possible to interconnect the winding to the bearings 50 and to apply the control current to these bearings. The advantage of the embodiment shown is its simplicity and light construction. Another related embodiment of a mirror drive employs a permanent magnet arranged on the mirror 23, the mirror 23 being disposed in a variable magnetic field.

When it is ascertained that the angular position of the scanning mirror 23 is directly proportional to the control current, the mirror position may then be derived from the magnitude of the control current. In that case only small errors in the mirror position, which are caused by external disturbances, such as an irregularity in the supply voltage or a push against the apparatus, which errors are non critical when scanning a single film frame but which culminate when a plurality of frames are scanned, need be detected. Then it suffices to detect whether the scanning mirror 23 actually occupies its central position, if the control current has the value corresponding to this central position.

Figure 18:
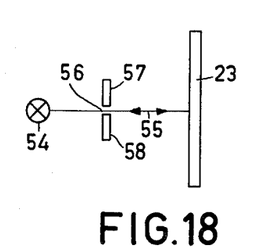
FIG. 18 shows a system for determining the centre position of the scanning mirror.

This detection may for example be realized in the manner illustrated in FIG. 18. A light source 54 illuminates a slit 56. The beam 55 emerging from the slit 56 is incident on the reflecting back of the mirror 23. The slit 56 is bounded by two radiation sensitive detectors 57 and 58. When the mirror 23 occupies its exact central position the beam 55 returns along itself and is symmetrical incident on the detectors 57 and 58. When the scanning mirror 23 occupies a position other than its centre position, one of the detectors 57, 58 will receive more light than the other. The difference signal of the detectors 57 and 58 provides an indication about the magnitude and the direction of a deviation from the actual position of the mirror 23 relative to its central position. By applying the difference signal to the terminals 52 (in FIG. 17), the position of the mirror 23 can be corrected.

In order to enable an accurate control of the position of the scanning mirror 23, in accordance with the invention, a mirror-position detection system is employed which comprises two gratings, of which one grating is image onto the other grating via the scanning mirror 23. Behind the second grating there is arranged a radiation sensitive detection system. A movement of the scanning mirror 23 results in a movement of the image of the first grating at the location of the second grating. As a result of this, the detection system will supply a train of pulses depending on the movement of the scanning mirror 23.

Figure 19:
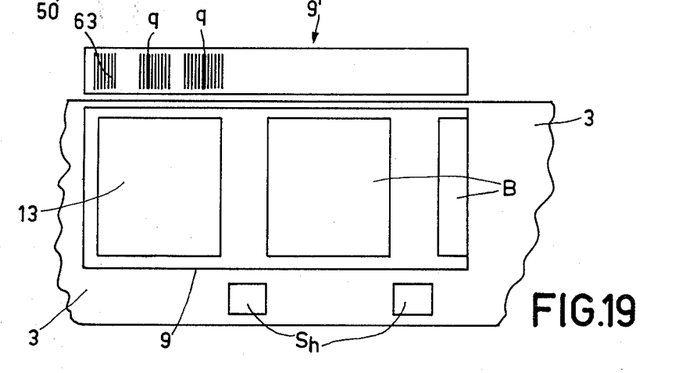
FIG. 19 shows a film gate and a grating window in which there is arranged a first grating of a mirror-position detection system in accordance with the invention, FIG. 20, in perspective, shows a second grating for said system together with the associated detector.
Figure 20:
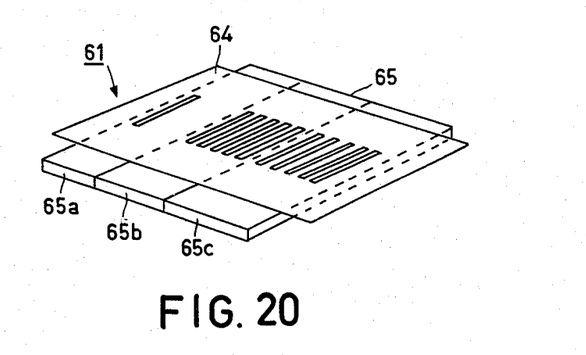

Preferably, the first grating is arranged in a separate grating window which is located in the plane of the film gate 9 above said film gate 9. FIG. 19 is an elevation of the film gate 9 containing the film 3 and of the grating window 9' with the first grating 63. This grating is illuminated simultaneously with the film 3. Above the color separating system 26 (compare FIG. 1), a mirror 60 is arranged, which reflects the light coming from the first grating to a second grating and a detection system arranged behind said second grating. FIG. 20 shows an elevation of the assembly of the second grating 64 and the detection system 65. In FIG. 1 this assembly is schematically represented by a block 61. The ratio of the grating period of the first grating 63 to that of the second grating 64 is equal to the optical magnification of the imaging system comprising the elements 20, 21, 23, 24, 25 and 26.

Figure 22:
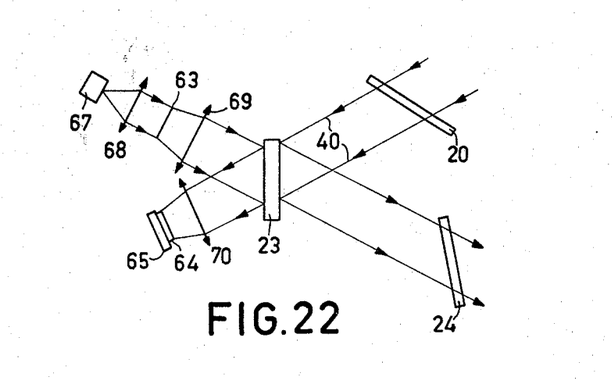
FIG. 22 shows a second embodiment of a mirror-position detection system in accordance with the invention

The first grating 63 may also be arranged outside the plane of the film gate 9. In that case an additional light source is required for illuminating said grating 63. As is shown in FIG. 22 the grating 63 may then for example be imaged on the grating 64 via the reflecting back of the scanning mirror 23. In FIG. 22 a light source is designated 67 and a collimator lens 68. The lenses 69 and 70, in conjunction with the scanning mirror 23, image the grating 63 onto the grating 64.

Figure 21:
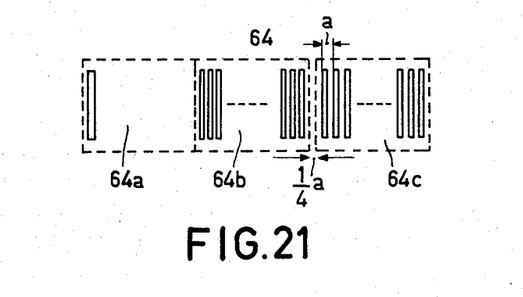
FIG. 21 is a plan view of said second grating.

The gratings 63 and 64 preferably have the special shape shown in FIGS. 19 and 21. The first grating 63 comprises a series of transparent lines, of which each time for example the 32nd line is missing. In FIG. 19 the positions of the missing lines are designated q. The grating 64 is divided into three grating sections 64a, 64b and 64c as is shown in FIG. 21. As is shown in FIG. 20, the detector 65 also comprises three sections 65a, 65b and 65c. The grating sections 64b and 64c have an equal number of, for example 32, grating lines. The lines of the grating section 64c are shifted by a quarter of the grating period a relative to the lines of the grating section 64b. Thus, when the scanning mirror 23 is rotated through an angle corresponding to one grating period, the detector section 65c will supply a pulse prior to or after the detector section 64b, depending on the direction of rotation of the scanning mirror 23.

By counting the number of pulses supplied by the detector sections 65b and 65c in an electronic circuit the magnitude, and, by determining the phase difference between the pulse trains, the direction of rotation of the scanning mirror 23 can be determined.

If in the grating 63 one line is missing every 31 grating lines and the number of lines of the grating section 64b and 64c is 32, the absence of the grating lines in the grating 63 will not result in an amplitude modulation in the signals from the detector sections 65b and 65c. When the difference between the number of grating lines of the grating sections 64b and 64c and of the series of grating lines in the grating 63 is greater than 1, the additional modulation as a result of the missing lines in the grating 63 will be small.

Since a first grating is imaged on a second grating, the signals from the detector section 65b and 65c have a substantially higher amplitude than if a grating with 32 grating lines would be imaged onto a single slit, which amplitude is 32 times as high if each grating section has 32 lines. As the grating sections 64b and 64c are shifted relative to each other by a quarter of their grating period, four zero passages occur in the detector signal for each movement of the image of the grating 63 over one grating period. As a result of this, a rotation of the scanning mirror 23 through an angle which is a quarter of the angle which corresponds to one grating period can be detected.

The width of the single grating line of the grating section 64a is equal to the grating period of the image of the grating 63. Thus, always one transparent line of the image of the grating 63 will fall within said single grating line, except when a missing line of the grating 63 passes. If scanning has been regular, the output signal of the detector section 65a is a constant signal with negative peaks at constant intervals. If the grating 63 comprises series of 31 grating lines, the peaks in the signal from the detector section 65a should occur after 31 pulses in the signal from the detector section 65b or 65c. If this is not the case, the scanning has been irregular. The irregularity, as a result of which too many or too few pulses are supplied during scanning, may be caused by external disturbances, such as an inaccuracy in the supply voltages or a push against the apparatus.

As the grating section 64a comprises only one line, the signal from the detector section 65a is small. However, this presents no problems, because this grating section merely serves to detect whether a deviation has occurred and not to perform an accurate measurement.

Moreover, it is known, from the signals from the detector sections 65b and 65c, when the missing lines of the grating 63 should pass. Furthermore, if the grating sections 64b and 64c comprise 32 grating lines, the check should be repeated after every 32 lines (pulses). It is obvious that in this case only disturbances causing an error corresponding to, at the most, 31 grating lines can be detected and thus be corrected automatically. A greater fault or group of faults should be corrected manually with the aid of the framing control.

The number of 32 grating lines for the grating sections 64b and 64c may be selected so as to obtain an easy digital processing of the detector signals. However, the grating sections 64b and 64c may also comprise more or less lines, the number being determined mainly by the number of lines of the first grating 63, that can be imaged simultaneously onto the grating 64 by an imaging system with a specific aperture angle. In a realized embodiment of a mirror-position detector system in accordance with the invention the number of grating lines of the grating sections 64b and 64c was 20.

Figure 23:
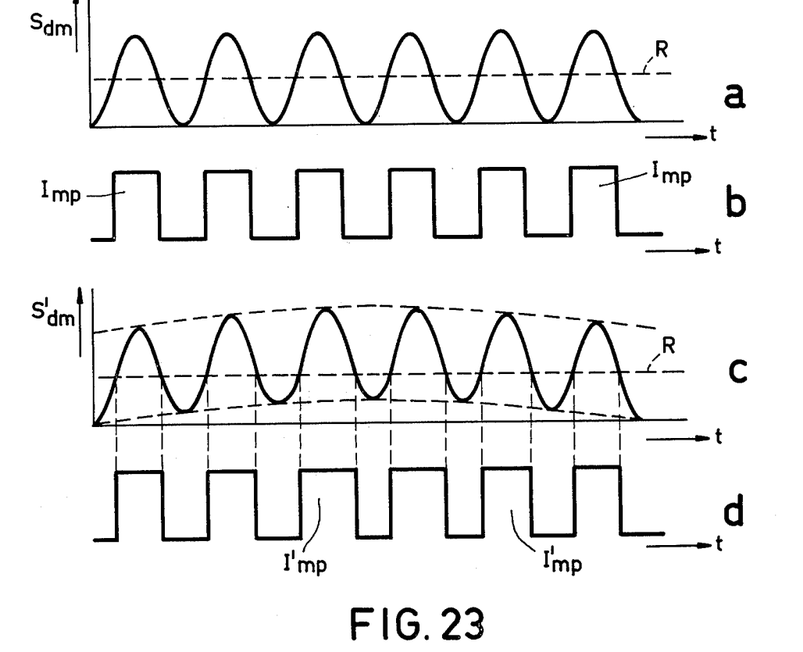
FIG. 23a represents the ideal output signal of the detector of the mirror-position detection system.
FIG. 23b represents a train of counting pulses derived from said signal.
FIG. 23c represents the output signal of a detector of mirror-position detection system in which a first grating is arranged in the plane of the film gate.
FIG. 23d shows a train of counting pulses derived from the last-mentioned signal.

In the foregoing it has been suggested that the detector sections 64b and 64c supply pulse-shaped signals. In reality the signals $S_{dm}$ are sinusoidal, as is shown in FIG. 23a. In an electronic processing circuit a train of pulses Imp (FIG. 23b) is derived from said signal, the positions and the lengths of the pulses being determined by the intersections of the signal Sdm with a reference level R.

Figure 24:
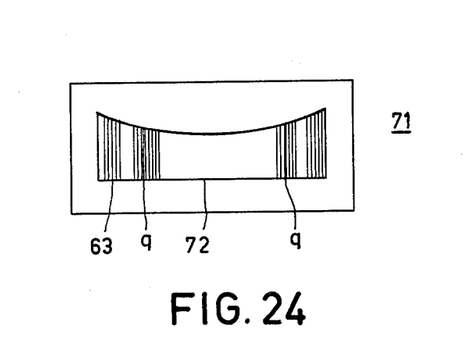
FIG. 24 shows a light mask which is adapted to be arranged before the first grating.

When the grating 63 is arranged in the plane of the film gate 9 and has a length equal to two film frames, the signal Sdm will exhibit an amplitude modulation as shown in FIG. 23c, because the axis of the illumination system extends through the centre of the film gate. As a result of this mainly the duty cycle, i.e. the ratio of the pulse width to the distance between the pulses, of the pulses I'mp (FIG. 23d) derived from said signal will deviate from the 50% duty cycle of the pulses Imp of FIG. 23b. As a result of this the mirror position is no longer accurately defined. In order to compensate for this effect, a mask 71 with an aperture 72 in accordance with FIG. 24 may be arranged before the grating window.

It is to be noted that for the sake of simplicity FIGS. 23a and 23c show only a few periods of the sinusoidal signals. In reality the number of periods will be greater, for example 20.

Figure 25:
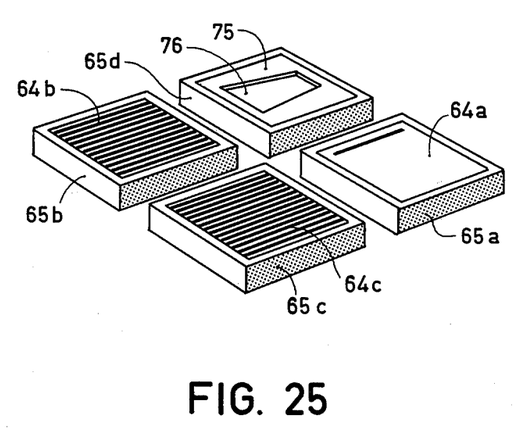
FIG. 25 shows a second embodiment of the second grating with associated detector for the mirror-position detection system.

The influence of the light-distribution on the signal $S_{dm}$ may also be eliminated by means of an additional detector section 65d in front of which a mask 75 with an aperture 76 is arranged (see FIG. 25). The aperture 76 has been selected so that it transmits the same amount of light as the total number of grating lines of grating section 64b or grating section 64c. The detector section 65d supplies a reference signal by means of which the signals from the detector sections 65b or 65c can be rendered independent of the light distribution.

Instead of behind each other the detector sections and the grating sections may also be arranged in accordance with a square, as is shown in FIG. 25. The detector sections may for example be PIN photo-diodes.

What is claimed is:

1. An apparatus for converting cinematographic pictures into video signals, which apparatus comprises a film gate, transport means for moving a film through the film gate and opto-electronic means for scanning a film frame, which is located in the film gate, with a light beam and for converting the light beam which has been modulated by the film frame into electronic signals, characterized in that there is provided an illumination system for simultaneously illuminating the entire film gate, and that the said opto-electronic means comprises a scanning mirror, which is pivotable about an axis which is effectively transverse to the direction of film transport, at least one row of radiation sensitive detectors, the number of detectors in each row being equal to the number of points to be scanned of a line of the film frame, and an optical imaging system which includes said scanning mirror for imaging a line of the film frame having been selected by the scanning mirror on the row of detectors, said imaging system having a first portion disposed between said film gate and said scanning mirror and consisting solely of mirrors for projecting light from said film gate onto said scanning mirror and a second portion disposed between said scanning mirror and said detectors for projecting light from said scanning mirror onto said detectors.

2. An apparatus for converting cinematographic pictures into video signals, which apparatus comprises a film gate, transport means for moving a film through the film gate, opto-electronic means for scanning a film frame, which is located in the film gate, with a light beam and for converting the light beam which has been modulated by the film frame into electronic signals and an illumination system for simultaneously illuminating the entire film gate, said opto-electronic means comprising a scanning mirror which is pivotable about an axis which is effectively transverse to the direction of film transport, at least one row of radiation sensitive detectors, the number of detectors in each row being equal to the number of points to be scanned of a line of the film frame, and an optical imaging system, which includes said scanning mirror, for imaging a line of the film frame having been selected by the scanning mirror on the row of detectors, said imaging system including elements, in the form of mirrors, arranged between the film and the scanning mirror, said apparatus further including a sprocket hole detection system for detecting regularly spaced sprocket holes in a strip of film, said sprocket hole detection system comprising an auxiliary illumination system for forming a light spot onto the strip of film in which the sprocket holes are located, and a radiation sensitive auxiliary detector for detecting the amount of light coming from the area on the film which is illuminated by the auxiliary illumination system, said auxiliary illumination system and said auxiliary detector both having an effective aperture whose dimension in and transverse to the direction of film transport, respectively, is substantially smaller than, and of the same order of magnitude as, the dimension of the sprocket holes in and transverse to the direction of film transport, respectively.

3. An apparatus as claimed in claim 2, characterized in that the auxiliary illumination system is constituted by a radiation source and a cylindrical lens system whose cylinder axis is transverse to the direction of film transport and that the auxiliary detector is constituted by a fibre-optic array of which at least the end which faces the film has an elongate cross-section and of which the other end is connected to a photo diode.

4. An apparatus as claimed in claim 2, characterized in that the auxiliary illumination system is constituted by a radiation source and a fibre optic array connected thereto, of which at least the end which faces the film has an elongate cross-section and that the auxiliary detection system is constituted by a fibre-optic array of which at least the end which faces the film has an elongate cross-section and of which the other end is connected to a photo diode.

5. An apparatus as claimed in claim 4, characterized in that each of the fibre optics arrays is constituted by a single optical fibre with a flattened end.

6. An apparatus as claimed in claim 4 or 5, for detecting sprocket holes of circular cross-section, characterized in that the cross-section of at least that end of the fibre optic array(s) facing the film is an annular segment, whose radius is of the order of magnitude of the radius of a sprocket hole.

7. An apparatus as claimed in claim 4, in which each of the fibre optic arrays is constituted by a row of optical fibres of circular cross-section and in which the auxiliary illumination system and the auxiliary detection system are disposed on the same side of the film, characterized in that there is provided one row of optical fibres, the fibres being alternately connected to the radiation source and to the photo cell.

8. An apparatus for converting cinematographic pictures into video signals, which apparatus comprises a film gate, transport means for moving a film through the film gate, opto-electronic means for scanning a film frame, which is located in the film gate, with a light beam and for converting the light beam which has been modulated by the film frame into electronic signals, and an illumination system for simultaneously illuminating the entire film gate, said opto-electronic means comprising a scanning mirror, which is pivotable about an axis which is effectively transverse to the direction of film transport, at least one row of radiation sensitive detectors, the number of detectors in each row being equal to the number of points to be scanned of a line of the film frame, and an optical imaging system, which includes said scanning mirror, for imaging a line of the film frame having been selected by the scanning mirror on the row of detectors, said imaging system further including elements, in the form of mirrors, arranged between the film and the scanning mirror, said apparatus further including an opto-electronic mirror-position detection system for detecting the position of the scanning mirror, said mirror-position detection system comprising a first stationary grating, a second stationary grating, an imaging system for imaging the first grating on the second grating via the scanning mirror, and a radiation sensitive detection system arranged behind the second grating.

9. An apparatus as claimed in claim 8, characterized in that the first grating is arranged in the plane of the film gate, and the imaging system for imaging the first grating on the second grating is constituted by elements of the imaging system for imaging one line of a film frame on a row of detectors.

10. An apparatus as claimed in claim 8 or 9, characterized in that the second grating comprises three grating sections, a first grating section comprising only one transparent line and a second and a third grating section each comprising $n_1$ transparent grating lines and having the same grating period, the grating lines of the second grating section furthermore being shifted relative to the grating lines of the third grating section over a distance equal to a quarter of the grating period, and that the first grating comprises series of each time $n_2$ transparent grating lines, the distance between the series being equal to one and half times the grating period within the series and $n_1$ and $n_2$ being integers and $n_2$ being preferably equal to $n_1 - 1$.

11. An apparatus for converting cinematograhic pictures into video signals, which apparatus comprises a film gate, transport means for moving a film through the film gate, opto-electronic means for scanning a film frame, which is located in the film gate, with a light beam and for converting the light beam which has been modulated by the film frame into electronic signals and an illumination system for simultaneously illuminating the entire film gate, said opto-electronic means comprising a scanning mirror, which is pivotable about an axis which is effectively transverse to the direction of film transport, at least one row of radiation sensitive detectors, the number of detectors in each row being equal to the number of points to be scanned of a line of the film frame, and an optical imaging system, which includes said scanning mirror, for imaging a line of the film frame having been selected by the scanning mirror on the row of detectors, said imaging system further including elements, in the form of mirrors, arranged between the film and the scanning mirror, and said illumination system including a rectangular illumination window, the long and the short sides of the illumination window, respectively, extending transversely and parallel to the direction of film transport, and the dimension of the scanning mirror transverse to its axis of rotation being proportional to the dimension of the image of the short side of the illumination window at the location of the scanning mirror.

12. An apparatus as claimed in claim 11, wherein the dimension of the film gate in the direction of film transport corresponds to a length of film comprising two film frames and the scanning mirror is rotatable through a maximum angle which corresponds to said length of film, characterized in that the illumination system comprises means which produce a uniform light distribution.

* * * * *